United States Patent

[11] 3,633,128

[72] Inventor Ernesto G. Sevilla
        Herkimer County, N.Y.
[21] Appl. No. 87,029
[22] Filed Nov. 5, 1970
[45] Patented Jan. 4, 1972
[73] Assignee The Singer Company
        Rochester, N.Y.

[54] RELAXATION OSCILLATOR WITH OUTPUT FREQUENCY SELECTIVELY SHIFTABLE BETWEEN TWO LIMITS
9 Claims, 2 Drawing Figs.

[52] U.S. Cl. .................................................. 331/111,
        331/177 R, 331/179
[51] Int. Cl. .................................................. H03k 3/35
[50] Field of Search .................................. 331/111,
        177 R, 179; 307/252 F

[56] References Cited
OTHER REFERENCES

Spofford, Jr., " The D13T– A Programmable Unijunction Transistor," General Electric Application Note 90.70, November 1967, pp. 1– 14.

*Primary Examiner*—Roy Lake
*Assistant Examiner*—Siegfried H. Grimm
*Attorneys*—George W. Killian, Patrick J. Schlesinger, Charles R. Lepchinsky and Jay M. Cantor ABSTRACT: The circuit of the present invention discloses a relaxation oscillator comprising a programmable unijunction transistor which is so controlled that the output frequency may be smoothly shifted between two limits. A first transistor circuit and associated resistors control the charge and discharge rate of a capacitor which is coupled to the anode, or trigger point, of the programmable unijunction transistor. The charge and discharge time of the said capacitor controls, in part, the output frequency. A second transistor circuit and associated resistor control the charge and discharge rate of a second capacitor coupled to the gate of the programmable unijunction transistor. The instantaneous magnitude of the potential of the gate of the programmable unijunction transistor is controlled by said second capacitor; and the magnitude of the voltage at the gate determines the magnitude of the voltage required at the trigger point to render the programmable unijunction transistor conducting.

PATENTED JAN 4 1972

3,633,128

INVENTOR.
ERNESTO G. SEVILLA
BY George W. Killian
AGENT

RELAXATION OSCILLATOR WITH OUTPUT FREQUENCY SELECTIVELY SHIFTABLE BETWEEN TWO LIMITS

BACKGROUND OF THE INVENTION

The present invention relates to the control of an oscillator circuit and more specifically suggests how the oscillator circuit may be used for controlling the speed of a stepping motor. Very briefly, a stepping motor is a motor for use in special applications, wherein it is desired to turn the output shaft a predetermined number of degrees in response to a specialized input signal which may comprise one or more components. For example, the output shaft of a stepping motor may be designed to seek any one of a plurality of possible steady state positions. By an appropriate application of a series of input signals, it is possible to make the motor appear to be rotating continuously. Depending upon the design of the motor, its intended application and the driving circuit, stepping motors may be designed to operate at a rate of at least 1,000 steps per second with up to at least 200 steps per revolution and still be able to stop at any required shaft position. In order to drive such motors at their highest attainable speed, for a number of steps or revolutions, it is frequently necessary to start the motor at a relatively slow speed and accelerate it. In a similar manner, it is sometimes necessary to decelerate a stepping motor from its maximum angular velocity to a lesser angular velocity before it can be stopped at a precisely predetermined angular position.

The present invention relates more specifically to a controlled relaxation oscillator whose output frequency may be smoothly and selectively shifted between an upper and lower output frequency. The invention employs a programmable unijunction transistor together with first and second circuit means for selectively controlling the potential applied to the anode and gate electrodes of the programmable unijunction transistor.

SUMMARY OF THE INVENTION

To accelerate and decelerate a stepping motor, it is necessary to provide a clock source with an output rate that can be appropriately and gradually modified in response to an external signal. A stable voltage controlled oscillator would be well suited to this application. In order to minimize the tendency of the circuit to vary as a result of component selection, the means of modifying the voltage should include passive components. The present invention employs a programmable unijunction transistor (PUT) which is characterized in that the magnitude of the voltage required at the trigger point to render the PUT conductive may be closely controlled by the magnitude of the voltage on its gate element. The control voltage is in turn controlled by an RC network that is selectively switched between two stable states. By a judicious choice of components, the resulting charge and discharge curves can be made to have substantially the same characteristics, or the two curves can be shaped to suit the desired function. The circuit of the invention employs a basic relaxation oscillator including the PUT. One transistor circuit is used to turn the oscillator on or off. The pulse output rate of the oscillator is controlled, in part, by controlling the potential at the trigger point (or anode) of the PUT. The potential at the trigger point is determined by an RC network. A second transistor circuit is used to switch the gate from one steady state condition to another. In one condition, the oscillator will have a relatively low output frequency, while in the other condition, the oscillator will have a relatively high output frequency. In the one condition, the stepping motor will be driven at a relatively slow rate while in the other condition, the stepping motor will be driven at a relatively high rate.

BRIEF DESCRIPTION OF THE DRAWING

A more complete understanding of the invention may be obtained by making reference to the drawing in conjunction with the following detailed description. In the drawing.

DESCRIPTION OF THE PREFERRED EMBODIMENT

Figure 1:
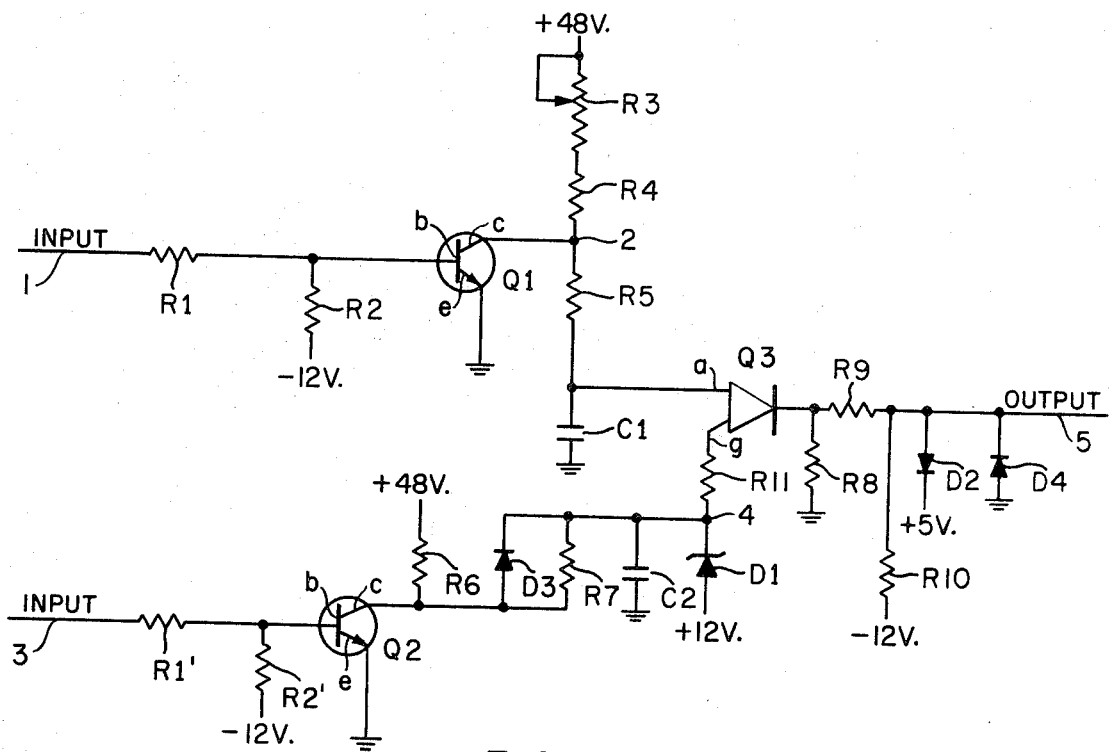
FIG. 1 comprises a schematic of the circuit incorporating the present invention.

The circuit of the present invention employs numerous electronic components which are schematically and symbolically illustrated in FIG. 1 using symbols which are conventional in the art to which the invention pertains. In order to facilitate identification of components and association with the nature of the component, the elements have been designated in a manner which is conventional in the art. More specifically, resistor elements are given a numerical designation preceded by the letter R; capacitors are given a numerical designation preceded by the letter C; diodes are given a numerical designation proceded by the letter D and semiconductor junction devices are given a numerical designation preceded by the letter Q. As is conventional, any point in the circuit which is connected to ground potential is designated by a series of parallel lines positioned within the confines of an imaginary equilateral triangle. Terminals which are connected to power supplies are designated with a positive or a negative number indicating the voltage of the power supply at that point with respect to the ground potential. The power supply is, of course, a direct current power supply.

The unijunction devices Q1 and Q2 are frequently referred to as transistors and each one has base, collector and emitter electrodes designated $b$, $c$, and $e$, respectively. These transistors are of the type commonly referred to as NPN. More specifically, they are of the type wherein current may flow from the collector to the emitter when the base is positive with respect to the emitter. By making use of simple and well-known circuit modifications, it would be possible to use transistors of the PNP-type. The unijunction device designated Q3 has an anode, a cathode and a gate element designated $a$, $c$, and $g$, respectively. Q3 is a three terminal PNPN-device such as the type manufactured by the General Electric Company and designated D13T. The device Q3 is sometimes referred to as a programmable unijunction transistor or PUT. The device is characterized in that it is essentially a nonconducting device from anode to cathode unless, or until, an appropriate voltage with respect to the anode voltage is applied at the gate terminal $g$. This will cause the device Q3 to switch on and generate a negative resistance characteristic from anode $a$ to cathode $c$. That is, there will be a sharp decrease in the anode-cathode voltage combined with a corresponding increase in the anode to cathode current.

The circuit of the present invention may be in a variety of applications wherein it is desired to have an increasing and/or a decreasing output pulse rate from an oscillator such as a voltage controlled oscillator. For example, the output may be used to provide stepping signals to a stepping motor. Other applications will readily occur to those familiar with the wide range of utility of oscillators.

Referring now more specifically to FIG. 1, there will be seen an NPN-transistor Q1 which will be maintained in the off condition when the base $b$ is maintained at a potential which is negative with respect to the emitter $e$. Conversely, when the base $b$ of transistor Q1 is at a positive potential with respect to the emitter $e$, the transistor Q1 will be turned on and will conduct current from the collector $c$ to the emitter $e$. Appropriate potentials may be applied at the input 1 in order to provide an appropriate potential at the base $b$ of transistor Q1. In a typical example, when it is desired to maintain transistor Q1 in an off condition, a very low positive potential of the order of only a fraction of a volt may be applied at input 1. The resulting current from the input lead through resistors R1 and R2 to a negative 12-volt potential will cause the base $b$ of transistor Q1 to be placed at a slightly negative potential thereby maintaining transistor Q1 in a turned off condition. Conversely, when it is desired to turn transistor Q1 on, the potential at input 1 will be raised to approximately 3 or 4 volts and then the voltage division between resistors R1 and R2 will be such that the potential at base $b$ of transistor Q1 will rise to approximately 2½ volts, thereby driving the base $b$ of transistor Q1 positive with respect to the emitter $e$. When the transistor Q1 is turned on, a current may flow from the positive 48-volt potential through resistors R3 and R4 and from the collector $c$ to the emitter $e$ of transistor Q1 to ground. During the time that transistor Q1 is turned off, the capacitor C1 charges toward a potential of plus 48 volts at its upper plate and a ground potential at its lower plate. With transistor Q1 turned on, point 2 is changed from a plus 48 volt potential to substantially a ground potential and capacitor C1 will discharge through resistor R5, in a period of time determined by the time constant of the RC network comprising capacitor C1 and resistor R5. In a similar manner, the transistor Q2 may be turned off or on in response to the application of similar appropriate voltages at input 3. Resistors R1' and R2' are similar in design and function to resistors R1 and R2. With transistor Q2 turned off, capacitor C2 will be charged towards 48 volts, the circuit being from the 48-volt power supply through resistor R6 and diode D3 to capacitor C2 to ground. However, when transistor Q2 is turned on, the collector $c$ of transistor Q2 will be shifted to substantially ground potential and there will be a current flow from the plus 48 volt power source through resistor R6 to the collector $c$ of transistor Q2 and to the emitter $e$ of transistor Q2 to ground. Current will flow through resistor R7 from the charged capacitor C2 until capacitor C2 is discharged and from the plus 48-volt power source through resistor R6 to ground at the emitter $e$ of transistor Q2. Diode D3 shunts resistor R7 during charge of capacitor C2 but causes the discharge current to pass through resistor R7. As a result, the voltage at point 4 will be reduced from plus 48 volts to a lesser value as capacitor C2 discharges. The ultimate value of the potential at point 4 will be a function of the circuit comprising capacitor C2 and resistor R7 and the clamping effect of diode D1. In summary, when transistor Q2 is turned off, capacitor C2 will be fully charged and when transistor Q2 is turned on, capacitor C2 will start to discharge, thereby reducing the potential at point 4 to a value and at a rate which is determined by the circuit parameters. After a steady state potential has been reached at point 4 and the transistor Q2 is turned off, the potential at point 4 will rise towards plus 48 volts at a rate determined by the circuit parameters as capacitor C2 is recharged. From this, it will be seen that the potential at gate $g$ of the PUT Q3 will be controlled by the transistor Q2. That is, with the transistor Q2 turned off, point 4, and hence the gate $g$ of PUT Q3, will be at a relatively high potential. Whereas with the transistor Q2 turned on, point 4, and therefore gate $g$ of the PUT Q3, will be at a relatively low potential. In addition, it should be clearly recognized that the rate of change of the potential at gate $g$ of the PUT Q3 is controlled by the time constant of the circuit comprising capacitor C2 and resistors R6 and R7. The charging rate is determined by resistor R6 while the discharging rate is determined by resistor R7. That is, note that diode D3 shunts resistor R7 during charging of capacitor C2. The diode D1 provides a clamp so that the voltage at point 4 cannot go above or below predetermined values.

The circuit of the PUT Q3 as a relaxation oscillator will now be examined. First, it should be recognized that it is a characteristic of the PUT Q3 that the trigger point, or anode $a$, is closely controlled by the voltage applied to its gate element $g$. That is, the potential at gate $g$ will control very closely what potential must exist between the anode $a$ and cathode $c$ of the PUT Q3 before conduction may take place from the anode $a$ to cathode $c$. The manner in which the potential at the gate $g$ of the PUT Q3 may be controlled by transistor Q2 has already been shown. In addition, it has been shown that with transistor Q1 turned on, the capacitor C1 will be discharged but that when transistor Q1 is turned off, there will be a circuit to charge capacitor C1. Accordingly, with transistor Q1 turned off and capacitor C1 starting to charge from its discharged condition, the potential at the anode $a$ of the PUT Q3 will start to rise. When the potential at anode $a$ of Q3 reaches a critical value (as determined by the voltage at gate $g$ of PUT Q3), there will be a conduction of current from the anode $a$ to the cathode $c$ of PUT Q3 and to output lead 5. As a result of this flow of current, the potential at the cathode $c$ of PUT Q3 will be raised and the capacitor C1 will start to discharge. As capacitor C1 discharges, the potential at anode $a$ of PUT Q3 will fall below a critical valve and the conduction from anode $a$ to cathode $c$ of PUT Q3 will be terminated. In response to the termination of current through the PUT Q3 the capacitor C1 will start to recharge. The charge rate of capacitor C1 is, of course, a function of the time constant of the circuit comprising resistors R3, R4, R5, together with capacitor C1. As before, when capacitor C1 is charged to a critical value, there will be conduction from the anode $a$ to the cathode $c$ of PUT Q3. The events described will repeat periodically and the output lead 5 will be switched between ground and a positive potential at a rate determined by the various circuit parameters. The rate at which the output lead 5 changes between ground and a positive potential may be varied by controlling the potential at the gate $g$ of the PUT Q3. That is, if the potential at gate $g$ of PUT Q3 is adjusted to a value that requires a greater voltage between the anode $a$ and cathode $c$ of PUT Q3 before conduction may take place, more time will be expended in charging capacitor C1 to the required value and hence the rate at which the output lead 5 is switched from ground to a positive potential will be reduced. When the voltage at gate $g$ of PUT Q3 is at a relatively high value, the PUT Q3 will not conduct current from the anode $a$ to the cathode $c$ until the potential difference between the anode $a$ and cathode $c$ has reached a relatively high value. Conversely, when the potential at gate $g$ of PUT Q3 is at a relatively low potential, then a relatively low potential is required between the anode $a$ and cathode $c$ of PUT Q3 to permit conduction therebetween. Accordingly, when the gate $g$ of PUT Q3 is at a relatively high potential, the rate of change on output lead 5 will be relatively slow and conversely, when the potential at gate $g$ of PUT Q3 is at a relatively low potential, the rate of change at output lead 5 will be relatively high. Or stated differently, a high voltage at gate $g$ of PUT Q3 produces a low output frequency while a low voltage at gate $g$ of PUT Q3 produces a high output frequency. With the voltage at gate $g$ changing as capacitor C2 charges (or discharges) the output frequency of PUT Q3 will be smoothly shifted between two frequency limits.

The diode D1 connected between point 4 and a positive 12-volt power supply will conduct if the voltage across it exceeds 16 volts. Accordingly, diode D1 will keep the voltage at point 4 within the range of 12 to 28 volts. Diodes D2 and D4 provide appropriate clamps on output lead 5. Resistors R8, R9, and R10 associated with output lead 5 are selected to help control the conditions on output lead 5 and provide the desirable input characteristics for the succeeding circuit. Resistor R3 is an adjustable resistor and changing the resistive setting of resistor R3 will alter the time constant of the circuit comprising capacitor C1 and resistors R3, R4, and R5. A change in the time constant of the aforementioned circuit will affect the output frequency of the PUT Q3. It should be noted that a modification in the setting of resistor R3 will change both the high and low output frequency of the PUT Q3. That is, a change in resistor R3 will change the time required to charge capacitor C1.

The choice of component values is, of course, at least in part a function of the desired output frequency. For an application wherein it was desired to have the output frequency range of the PUT Q3 be somewhere in the vicinity of 300 cycles per second to 1,000 cycles per second, the following component values were found to be satisfactory.

| Resistors | Ohms |
| --- | --- |
| R1 | 1 K |

| | |
|---|---|
| R2 | 36 K |
| R3 | 500 K |
| R4 | 560 K |
| R5 | 510 K |
| R6 | 68 K |
| R7 | 82 K |
| R8 | 47 K |
| R9 | 1 K |
| R10 | 4 K |
| R11 | 1 K |

Capacitors C1 and C2 may have values of 0.0047 and 2.2 microfarads, respectively. As previously indicated, the PUT Q3 may be of type D13I. The transistors Q1 and Q2 may be of the type 2N3568 and 2N3646. The diode D1 may be of the type 1N4745.

Other values of components may be used in accordance with well established principles to modify the characteristics of the circuit as may be expedient.

Figure 2:
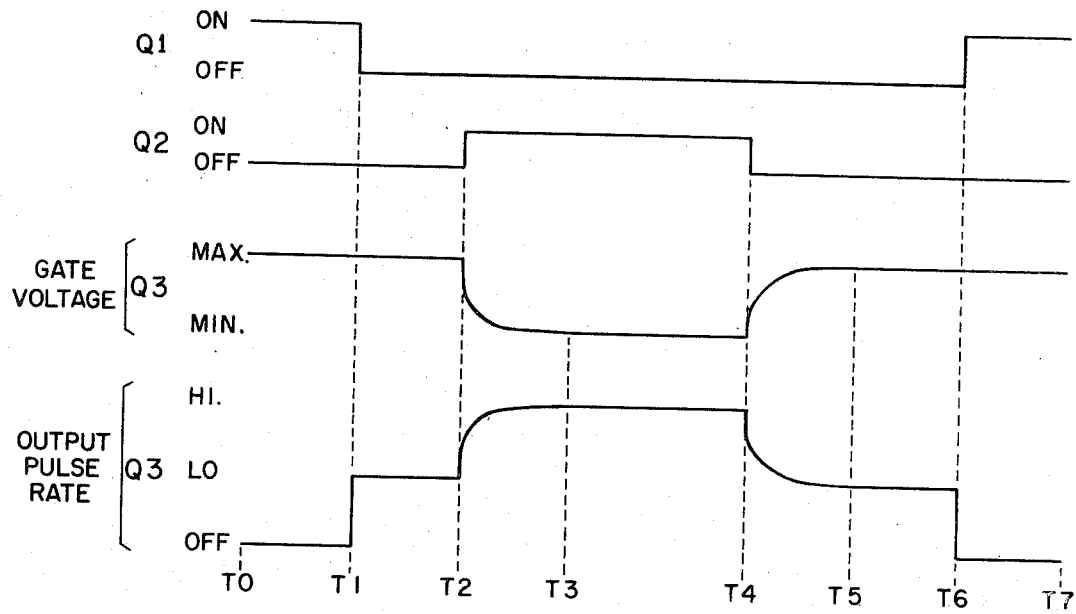
FIG. 2 is a timing chart indicating the conditions of various components of the circuit and the resultant output pulse rate of the oscillator.

Referring now more specifically to FIG. 2, there is shown therein a curve of the output pulse rate at output 5 and a curve of the gate potential at terminal g of the PUT Q3 and how these curves change as transistors Q1 and Q2 are turned on or off. More specifically, at time T0 the PUT Q3 is off and no pulses are appearing at output terminal 5. At the same time, transistor Q2 is maintained off by virtue of the fact that its base b is negative with respect to its emitter e. However, transistor Q1 is in the on condition. With transistor Q2 turned off, the voltage at gate g of PUT Q3 will be at a maximum value. When it is desired to obtain a low-frequency output signal at output lead 5, the transistor Q1 is turned off and the oscillator, including PUT Q3, begins to function and produces a relatively low frequency at output lead 5 as shown between times T1 and T2. When it is desired to produce a higher frequency output signal, the transistor Q2 will be turned on at time T2. As explained above, this will cause a gradual reduction of the voltage at gate g of PUT Q3. Thus, from time T2, when transistor Q2 is turned on to time T3, the voltage at gate g will gradually decline from its maximum steady state value to its minimum steady state value. The shape of the curve may be controlled by the time constants of the circuit that controls the voltage at gate g of PUT Q3. In response to the change of the gate voltage, the output frequency of the oscillator will be increased and therefore, between times T2 and T3, the output frequency will increase from the low rate to the high steady state rate. If transistor Q2 is turned off at time T4, the gate voltage at gate g of PUT Q3 will restore to its maximum value between times T4 and T5 and in the same interval of time, the output frequency will decline from its high value to its low value. When it is desired to terminate the output signal, transistor Q1 may be turned on as shown at time T6.

The circuit of the present invention may have numerous applications wherein it is desired to provide a means for gradually shifting the output frequency of an oscillator from a first steady state value to a second steady state value. As indicated, one application is for starting a stepping motor and accelerating it to a high speed and then decelerating it shortly before it is to be stopped. Thus, in FIG. 2, the acceleration period is the time between times T2 and T3 while the deceleration period is the interval between times T4 and T5.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and, therefore, such adaptations should and are intended to be comprehended in the meaning and range of equivalence of the following claims.

What is claimed is:

1. A relaxation oscillator comprising:
    a. a programmable unijunction transistor having an anode, a cathode and a gate electrode;
    b. a load circuit coupled to said cathode;
    c. a direct-current power source;
    d. first control means for selectively applying a smoothly increasing potential from said power source to said anode electrode until said programmable unijunction transistor is rendered conducting from said anode to said cathode; and
    e. second control means coupled to said gate electrode for selectively controlling the potential at which said programmable unijunction transistor is rendered conductive from said anode to said cathode in response to the application of potential to said anode.

2. The combination as set forth in claim 1 wherein said first control means includes a first capacitor which is charged from said power source until said programmable unijunction transistor is rendered conductive.

3. The combination as set forth in claim 2 wherein said second control means includes a second capacitor which is charged from said power source and wherein the instantaneous magnitude of the charge on said second capacitor controls the potential required on said first capacitor to render said programmable unijunction transistor conductive.

4. The combination as set forth in claim 3 wherein said first control means and said programmable unijunction transistor cooperate to form discharge means for discharging said first capacitor when said programmable unijunction transistor is rendered conductive.

5. The combination as set forth in claim 4 wherein said second control means has first and second stable states and wherein said second capacitor approaches a discharged and charged state as said second control means is switched from said first to said second and from said second to said first stable states, respectively.

6. The combination as set forth in claim 5 wherein said second control means includes first and second resistors and said second capacitor is charged in series with said first resistor and discharged in series with said second resistor.

7. The combination as set forth in claim 6 and including a unidirectional device in parallel with said second resistor for causing the charging current to said second capacitor to bypass said second resistor.

8. The combination as set forth in claim 7 wherein said first and second control means include first and second transistors, respectively.

9. The combination as set forth in claim 8 and including first and second individual means for selectively turning said first and second transistors off and on, respectively.

* * * * *